United States Patent [19]
Byrd et al.

[11] Patent Number: 6,158,457
[45] Date of Patent: Dec. 12, 2000

[54] GAS PRESSURE CONTROL APPARATUS

[75] Inventors: Douglas S. Byrd, Mogadore; David R. Greene, Avon Lake; Douglas A. Bosnik, Akron; Byron A. Crampton, Lakewood, all of Ohio

[73] Assignee: Western/Scott Fetzer Company, Westlake, Ohio

[21] Appl. No.: 09/313,454

[22] Filed: May 18, 1999

[51] Int. Cl.[7] .................................................. G05D 16/02
[52] U.S. Cl. ...................... 137/505.25; 137/507; 137/557
[58] Field of Search ............................... 137/505, 505.25, 137/505.28, 557, 507

[56] References Cited

U.S. PATENT DOCUMENTS

| | | |
|---|---|---|
| 1,827,266 | 10/1931 | Shipley . |
| 1,890,357 | 12/1932 | Barber . |
| 3,269,411 | 8/1966 | Teston ............................ 137/505.25 X |
| 3,342,205 | 9/1967 | Quinto . |
| 3,520,325 | 7/1970 | Stuart . |
| 3,699,998 | 10/1972 | Baranowski, Jr. . |
| 3,762,439 | 10/1973 | Heath . |
| 3,848,631 | 11/1974 | Fallon . |
| 3,926,208 | 12/1975 | Hoffman et al. . |
| 3,949,966 | 4/1976 | Fabish . |
| 4,015,630 | 4/1977 | Contreras . |
| 4,655,246 | 4/1987 | Phlipot et al. ...................... 137/505.11 |
| 5,135,023 | 8/1992 | Ross ................................... 137/505.11 |
| 5,413,096 | 5/1995 | Hart . |
| 5,509,407 | 4/1996 | Schuler ............................. 128/205.24 |
| 5,760,301 | 6/1998 | Shuman, Jr. . |

OTHER PUBLICATIONS

A drawing entitled "Prior Art Design (Ref Patent No. US 5760301)" dated Jan. 28, 2000.

Drawing No. RP30580B entitled "MIG Regulator Argon, 30 CFH Flow, Bulk" Feb. 25, 1998.

*Primary Examiner*—Stephen Hepperle
*Attorney, Agent, or Firm*—Jones, Day, Reavis & Pogue

[57] ABSTRACT

A gas pressure reduction apparatus has a high pressure inlet port and low pressure outlet port. A spring-biased piston is operatively interposed between the inlet and outlet ports. The apparatus includes a metal part with a high pressure passage communicating the inlet port with the piston. The high pressure passage has a portion with a relatively constricted flow area, whereby compression of gas flowing through the passage yields heat of compression that heats the metal part. The apparatus further includes a plastic part configured to engage and support the metal part in an operative position in which the inlet port communicates with an outlet port on a pressure vessel outlet valve.

25 Claims, 5 Drawing Sheets

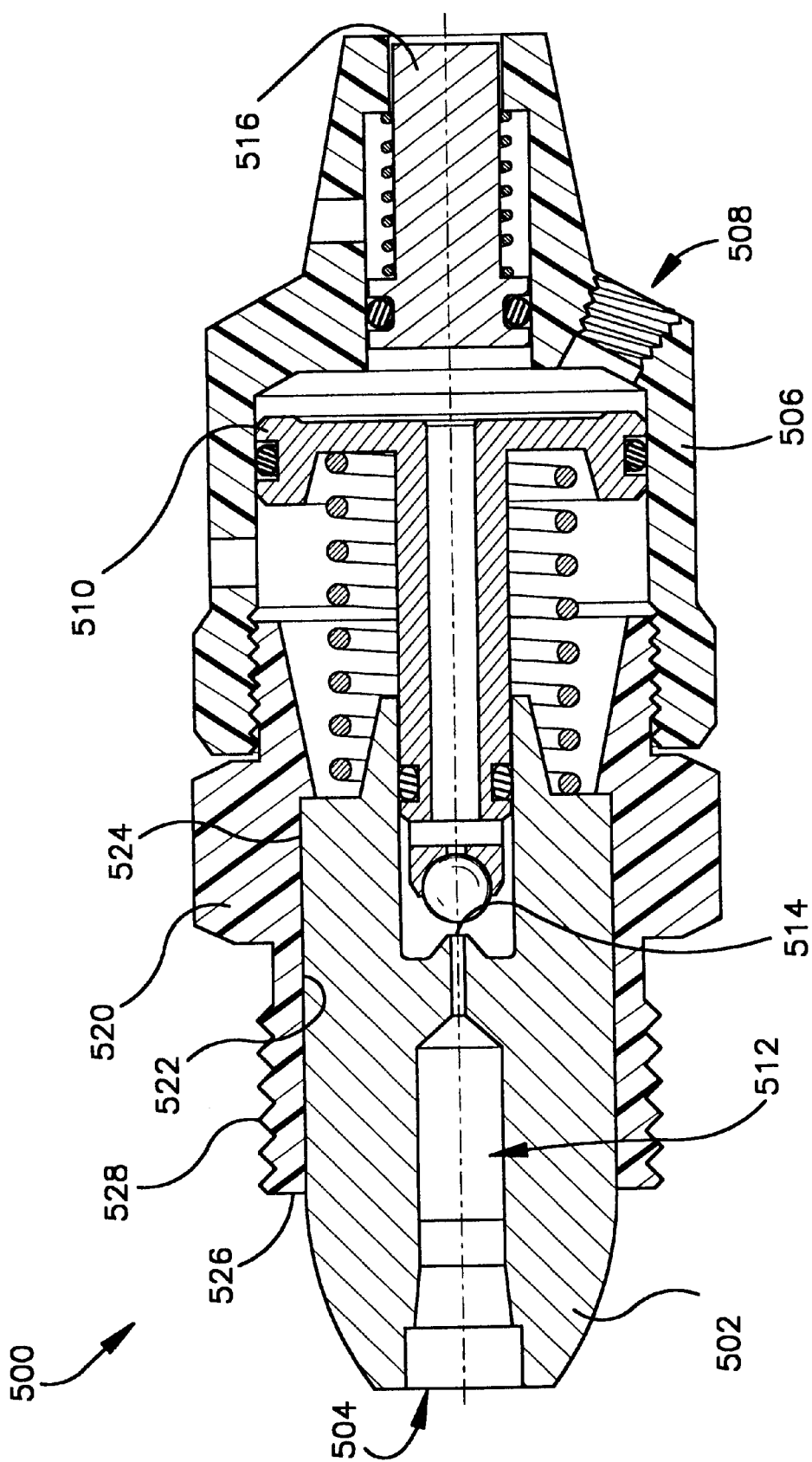

GAS PRESSURE CONTROL APPARATUS

FIELD OF THE INVENTION

The present invention relates to regulators for providing relatively low pressure flows of gas from high pressure sources.

BACKGROUND OF THE INVENTION

A pressurized gas may be stored in a cylinder having an outlet valve. The valve can be opened manually to release the stored gas to exit the cylinder at flow rates that correspond to the storage pressure in the cylinder. For example, pressurized oxygen for home health care may be stored in an aluminum cylinder having such an outlet valve. When the oxygen is to be released from the cylinder, a pressure-reducing regulator is first mounted on the outlet valve so that the oxygen must pass through the regulator before it is accessible for breathing. The operator then opens the outlet valve on the cylinder, and the oxygen emerges from the regulator at a pressure that is greatly reduced from the storage pressure in the cylinder.

The regulator has a high pressure gas flow passage which receives the oxygen directly from the outlet valve on the cylinder. The high pressure passage conveys the oxygen to a spring-biased piston which operates to limit the pressure of the oxygen emerging from the regulator. Before the oxygen reaches the piston, it flows through portions of the high pressure passage that constrict toward a control orifice. Accordingly, the oxygen flowing through the regulator undergoes at least partially isothermal compression in the high pressure passage. A corresponding amount of heat is then absorbed and disipated by the structure of the regulator. For this reason known regulators are formed predominately of brass or other metal materials that can withstand internal temperatures such as, for example, 1800° F. or more.

SUMMARY OF THE INVENTION

In accordance with the present invention, a gas pressure control apparatus has a high pressure inlet port and low pressure outlet port. A spring-biased piston is operatively interposed between the inlet and outlet ports. The apparatus includes a metal part with a high pressure passage communicating the inlet port with the piston. The high pressure passage has a portion with a relatively constricted flow area, whereby compression of gas flowing through the passage yields heat of compression that heats the metal part. The apparatus further includes a plastic part configured to engage and support the metal part in an operative position in which the inlet port communicates with an outlet port on a pressure vessel outlet valve.

In a preferred embodiment of the present invention, the plastic part of the apparatus defines a yoke which is receivable over a post valve on a pressure vessel. In another preferred embodiment, the plastic part has a screw-threaded sleeve portion engageable coaxially with a corresponding screw-threaded stem portion of an outlet valve on a pressure vessel.

BRIEF DESCRIPTION OF THE DRAWINGS

The foregoing and other features of the present invention will be apparent to those skilled in the art upon reading the following description in view of the accompanying drawings, wherein:

FIG. 9 is a sectional view of an apparatus comprising a fifth embodiment of the invention.

DESCRIPTION OF PREFERRED EMBODIMENTS

Figure 1:
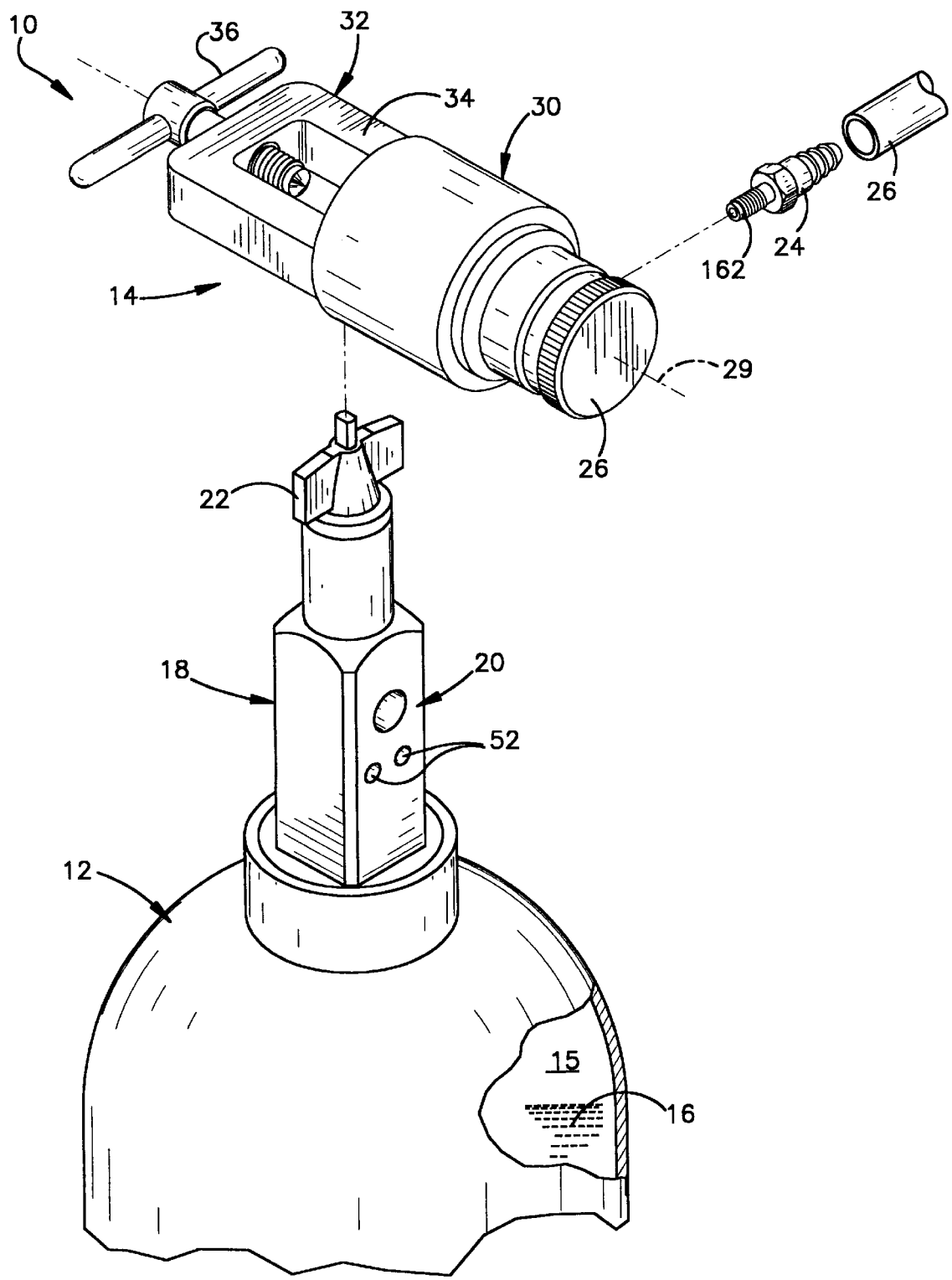
FIG. 1 is an exploded view of an apparatus comprising a first embodiment of the invention.

An apparatus 10 comprising a first embodiment of the present invention is shown partially in FIG. 1. The apparatus 10 includes a pressure vessel 12 and a regulator 14. The pressure vessel 12 in the first embodiment is an aluminum cylinder with a storage chamber 15 containing pressurized oxygen 16. An outlet valve 18 is mounted on the upper end of the cylinder 12. The outlet valve 18 in the first embodiment is a post valve with a gas outlet port 20, and includes a wing knob 22 for releasing the oxygen 16 to flow from the storage chamber 15 to the outlet port 20. Also shown in FIG. 1 is a barb outlet 24 for engaging an oxygen supply hose 26 that extends to an oxygen mask or the like. The regulator 14 is receivable over the post valve 18 in an operative position in which the regulator 14 communicates the outlet port 20 with the barb outlet 24. The regulator 14 then functions to provide an outlet flow of oxygen 16 at a pressure that is greatly reduced from the storage pressure in the chamber 15. Additionally, the regulator 14 in this embodiment includes a flow rate selector 26 for providing predetermined outlet flow rates.

Figure 2:
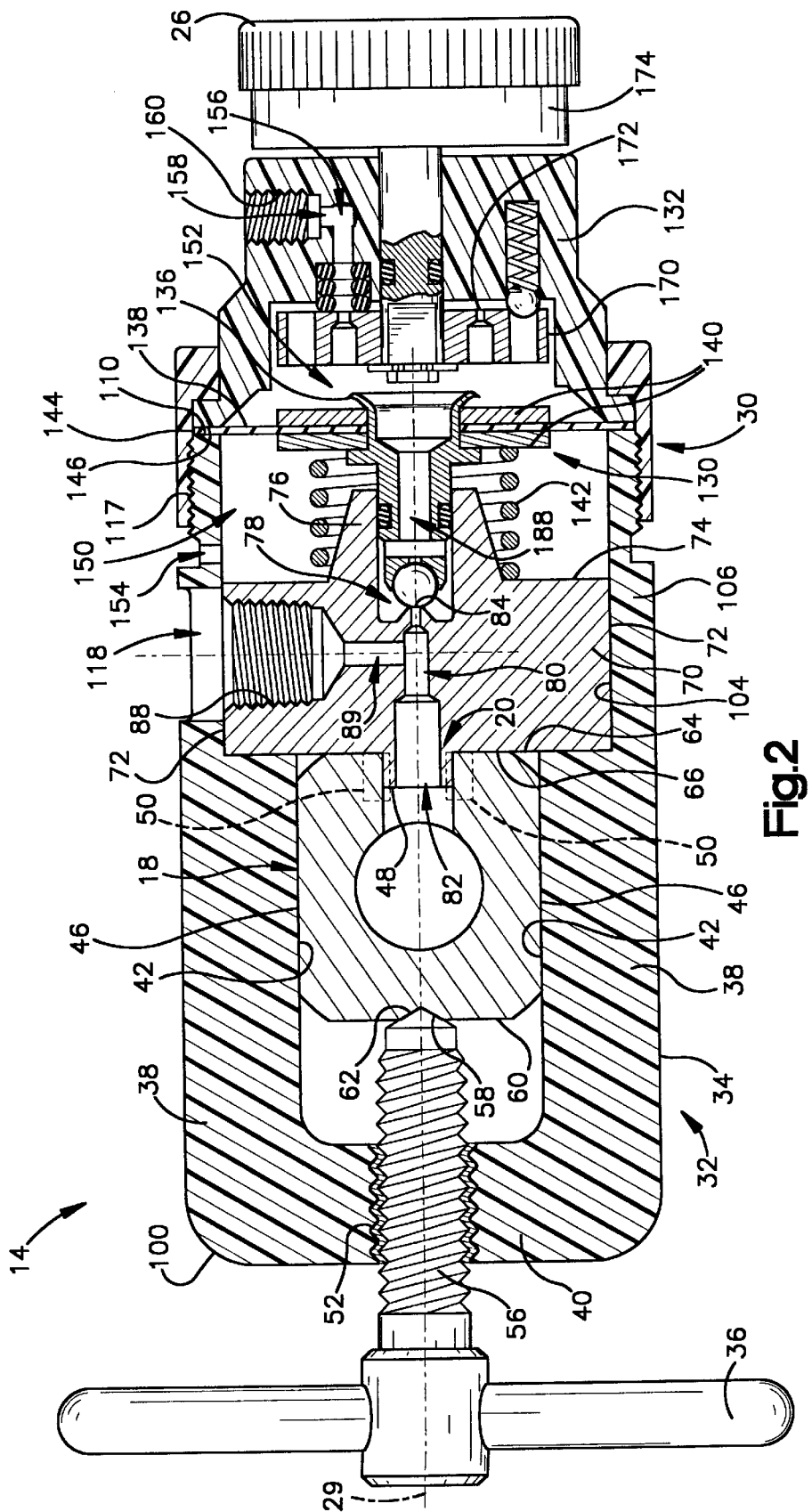
FIG. 2 is a sectional view showing parts of the apparatus of FIG. 1 in an interconnected relationship.

The regulator 14 is an elongated device with a longitudinal central axis 29, and has a valve portion 30 and a mounting portion 32, each of which extends about one-half the length of the regulator 14. The mounting portion 32 of the regulator 14 includes a yoke 34 and a T-handle 36. The yoke 34 is a generally U-shaped structure with a pair of axially elongated side sections 38 (FIG. 2) and a transversely extending base section 40. A pair of opposed, planar inner surfaces 42 of the side sections 38 are configured to engage corresponding opposite side surfaces 46 of the post valve 18 when the yoke 34 is received over the post valve 18, as shown in FIG. 2. An inlet stub 48 on the valve portion 30 of the regulator 14 is then received closely within the outlet port 20 on the post valve 18. A pair of alignment pins 50 projecting from the valve portion 30 of the regulator 14 are similarly received in a corresponding pair of alignment openings 52 (FIG. 1) in the post valve 18.

As further shown in FIG. 2, the base section 40 of the yoke 34 has a screw-threaded tubular insert 54. The insert 54 supports a shaft portion 56 of the T-handle 36 for movement along the axis 29 upon manual rotation of the T-handle 36 about the axis 29. A conical recess 58 on a rear surface 60 of the post valve 18 receives a conical end portion 62 of the shaft 56 when the T-handle 36 is advanced and tightened axially against the post valve 18. A planar front surface 64 of the post valve 18 then mates firmly with an opposed, planar rear surface 66 of the valve portion 30 of the regulator 14. Firm abutting contact between the opposed planar surfaces 64 and 66, as well as a close fit of the inlet stub 48 in the outlet port 20, helps to ensure that the oxygen 16 emerging from the post valve 18 does not escape through the yoke 34.

The valve portion 30 of the regulator 14 includes a metal body 70. The metal body 70 defines the inlet stub 48 and the planar rear surface 66 which surrounds the stub 48. The metal body 70 further has a cylindrical outer surface 72 and a planar, annular front surface 74 centered on the axis 29. A conical portion 76 of the metal body 70 projects longitudinally from the front surface 74 and also is centered on the axis 29.

A cylindrical bore 78 in the metal body 70 extends axially inward from the outer end of the conical projection 76. A high pressure gas passage 80 extends axially inward of the metal body 70 in the opposite direction from the inlet stub 48 toward the bore 78. More specifically, the high pressure passage 80 includes an inlet port 82 at the stub 48, and further includes a control orifice 84 at the bore 78. A branch passage 86 in the metal body 70 extends radially from the high pressure passage 80 to the cylindrical outer surface 72. The branch passage 86 has a screw-threaded outer end portion 88 for receiving a corresponding stem on a gas pressure gauge (not shown).

Figure 3:
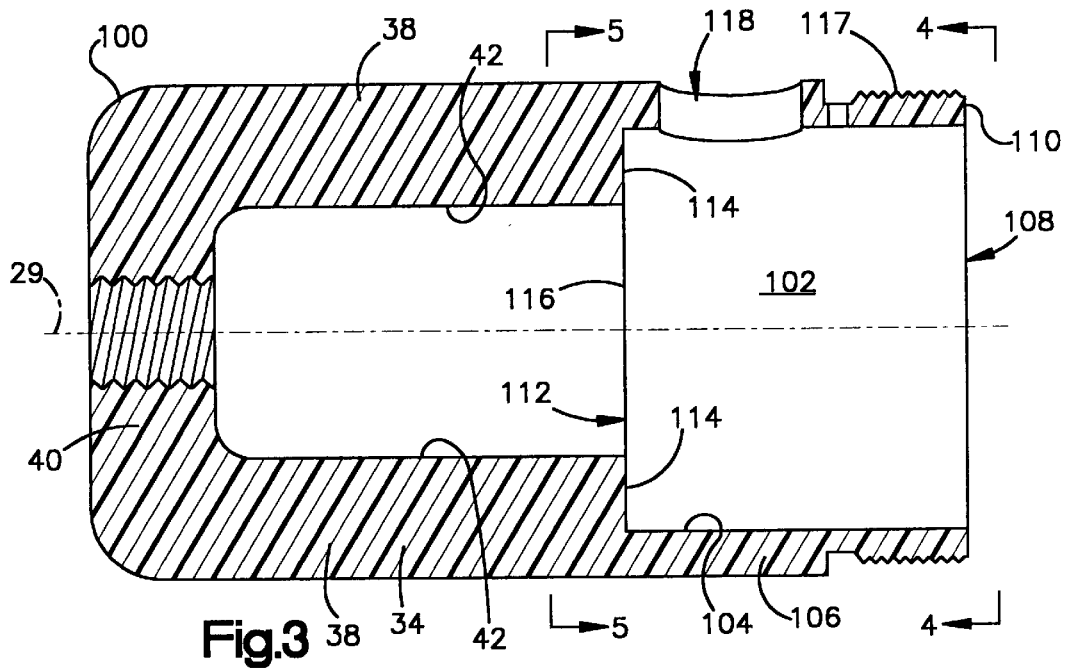
FIG. 3 is a sectional view of a part shown in FIG. 2.
Figures 4, 5:
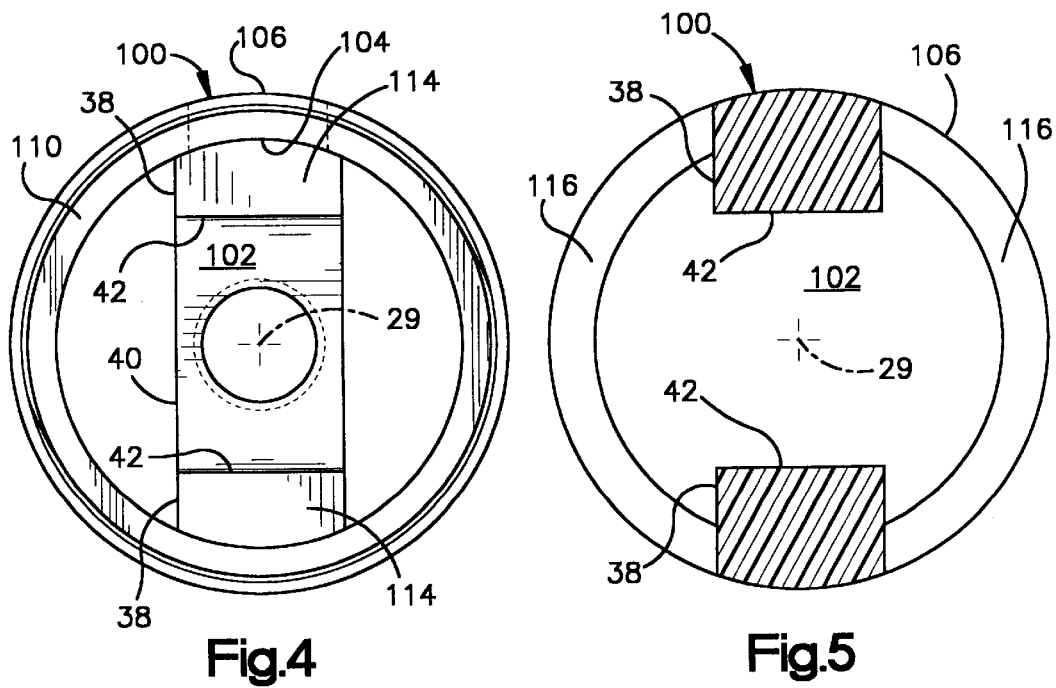
FIG. 4 is a view taken on line 4—4 of FIG. 3.
FIG. 5 is a view taken on line 5—5 of FIG. 3.

In accordance with a principal feature of the present invention, the metal body 70 is contained and supported by a plastic part 100 of the regulator 14. The plastic part 100 defines the yoke 34 and, as shown separately in FIGS. 3–5, has a cylindrical compartment 102 for containing the metal body 70. The diameter of the compartment 102 is defined by a cylindrical inner surface 104 of the plastic part 100. The cylindrical inner surface 104, in turn, is defined by a cylindrical wall portion 106 of the plastic part 100 that extends axially from the yoke 34 to the opposite end of the plastic part 100. The compartment 102 thus has an outer end 108 defined by an annular edge surface 110 of the cylindrical wall 106. An inner end 112 of the compartment 102 is defined in part by planar end surfaces 114 of the side sections 38 of the yoke 34, and in part by arcuate edge surfaces 116 of the cylindrical wall 106 that extend circumferentially between the side sections 38 of the yoke 34. An external screw thread 117 on the cylindrical wall 106 extends axially from the edge surface 110. An access opening 118 for the pressure gauge extends radially through the cylindrical wall 106.

The plastic part 100 could be formed separately from the metal body 70. The metal body 70 would then be received through the outer end 108 of the compartment 102 and moved axially inward until the planar rear surface 66 on the metal part 70 abuts the planar surfaces 114 on the yoke 34. The cylindrical inner and outer surfaces 104 and 72 would preferably establish an interference fit to interlock the metal body 70 and the plastic part 100. However, the plastic part 100 is preferably formed around the metal body 70 in an insert molding process to establish a more secure interlock. For example, the cylindrical inner and outer surfaces 104 and 72 in the first embodiment of the invention are tapered slightly so as to block movement of the metal body 70 axially outward of the compartment 102. Other interlocking arrangements can be used, as described below with reference to the second embodiment of the invention. Moreover, the plastic part 100 preferably is a one-piece structure made from a single homogenous material. By "one-piece" it is meant that the plastic part 100 is a single unit exclusive of separate but joined elements. The plastic material may include additives such as stabilizers, fillers, reinforcements, and the like.

The valve portion 30 of the regulator 14 further includes a piston/diaphragm assembly 130 and a generally cylindrical part which is known as bonnet 132. The bonnet 132 in the first embodiment also is formed of plastic, and is interconnected with the other plastic part 100 by a nut 134 which is screwed onto the cylindrical wall 106. The piston/diaphragm assembly 130 includes a piston 136 and a diaphragm 138. The piston 136 is mounted on the diaphragm 138 by a pair retainer rings 140. A spring 142 is engaged compressively between a retainer ring 140 and the planar front surface 74 of the metal body 70 so as to bias the piston/diaphragm assembly 130 axially away from the metal body 70, i.e. from left to right as viewed in FIG. 2. A peripheral portion 144 of the diaphragm 136 is clamped between the annular edge surface 110 of the plastic part 100 and an opposed annular edge surface 146 of the bonnet 132. In this arrangement, a pair of variable volume gas pressure chambers 150 and 152 are defined within the valve portion 30 of the regulator 14 on opposite sides of the piston/diaphragm assembly 130.

A vent opening 154 communicates the first pressure chamber 150 with the ambient atmosphere. A low pressure passage 156 in the bonnet 132 communicates the second pressure chamber 152 with an outlet port 158. The bonnet 132 has an internal screw thread 160 adjacent to the outlet port 158 for receiving an external screw thread 162 on the barb outlet 24 (FIG. 1).

The flow rate selector 26 includes a circular orifice plate 170. A circumferentially extending array of outlet orifices 172, each of which has a unique size, extends axially through the orifice plate 170. The orifice plate 170 is mounted on a manually rotatable knob 174 such that each orifice 172 can be moved into alignment with the low pressure passage 156 upon rotation of the knob 174 about the axis 29. A ball detent mechanism 176 operates between the orifice plate 170 and the bonnet 132 to retain a selected orifice 172 releaseably in alignment with the low pressure passage 156.

In operation of the apparatus 10 (FIG. 1), the oxygen 16 flowing through the post valve 18 enters the high pressure passage 80 in the metal body 70 through the inlet port 82. The oxygen 16 then flows from the high pressure passage 80 to the bore 78 through the control orifice 84, and further from the bore 78 to the second gas pressure chamber 152 through a passage 188 in the piston 136. As the gas pressure in the second chamber 152 increases, the pressure force acting on the piston/diaphragm assembly 130 in the second chamber 152 increases to a specified level that exceeds the combined forces of the spring 142 and the pressure acting against the free end of the piston 136 at the control orifice 84. The piston/diaphragm assembly 130 is then shifted to the left to a position in which the free end of the piston 138 blocks the control orifice 84, as shown in FIG. 2. The pressure at the control orifice 84 moves the piston/diaphragm assembly 130 back to the right as the oxygen 16 is vented from the second chamber 152 through the orifice plate 170 and the low pressure passage 156. This repeats continuously during operation of the apparatus 10 so that the gas pressure in the second chamber 152 cannot exceed the specified level. For example, the specified level of gas pressure in the first embodiment of the invention is within a range of about 20 psi to about 50 psi, whereas the storage pressure in the chamber 15 (FIG. 1) is about 2,200 psi. The operator of the apparatus 10 can then use the selector 26 to vary the outlet flow rate among the values that result from the differing flow areas at the orifices 172.

As further shown in FIG. 2, the high pressure passage 80 in the metal body 70 has axially successive constricted portions leading to the control orifice 84. When the oxygen 16 flows through the regulator 14 in the foregoing manner, it is constrained to undergo at least partially isothermal compression in those portions of the high pressure passage 80. The resulting heat of compression heats the metal body 70. In accordance with the present invention, the surrounding wall portion 106 of the plastic part 100 extends axially over the metal body 70, but is configured as a thin-walled cylinder and is thus spaced from the high pressure passage 80 by the radially extending mass of the metal body 70. This configuration enables the plastic part 100 to engage and support the metal body 70 while simultaneously being insulated from the heat of compression by the metal body 70. The open cylindrical configuration of the wall 106 further enables radiation and convection of heat from the conical projection 76 and the front surface 74 of the metal body 72 in the second chamber 152. Additionally, the planar surfaces 114 on the side sections 38 of the yoke 34 abut the rear surface 66 of the metal body 70 at locations that are spaced radially from the high pressure passage 80 so that the heat of compression can be conducted from the rear surface 66 to the post valve 18 before reaching the yoke 34.

Figure 6:
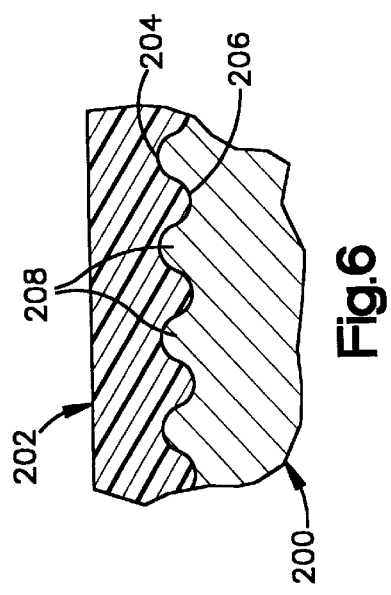
FIG. 6 is an enlarged partial view of parts of an apparatus comprising a second embodiment of the invention.

As noted above, a metal valve body and a plastic supporting part can be interlocked in accordance with the present invention in arrangements other than the tapered arrangement of the metal body 70 and the plastic part 100. For example, as shown partially in FIG. 6, a second embodiment of the invention includes an alternative metal valve body 200 and a corresponding alternative plastic supporting part 202. The metal body 200 and the plastic part 202 have mating cylindrical surfaces 204 and 206 with undulating contours defined by helically extending splines 208 on the cylindrical surface 204 of the metal body 200. The splines 208 inpart an oppositely undulating contour to the mating cylindrical surface 206 upon formation of the plastic part 202 around the metal body 200 in an insert molding process. The metal body 200 and the plastic part 202 are otherwise substantially the same as the metal body 70 and the plastic part 100 described above.

Figure 7:
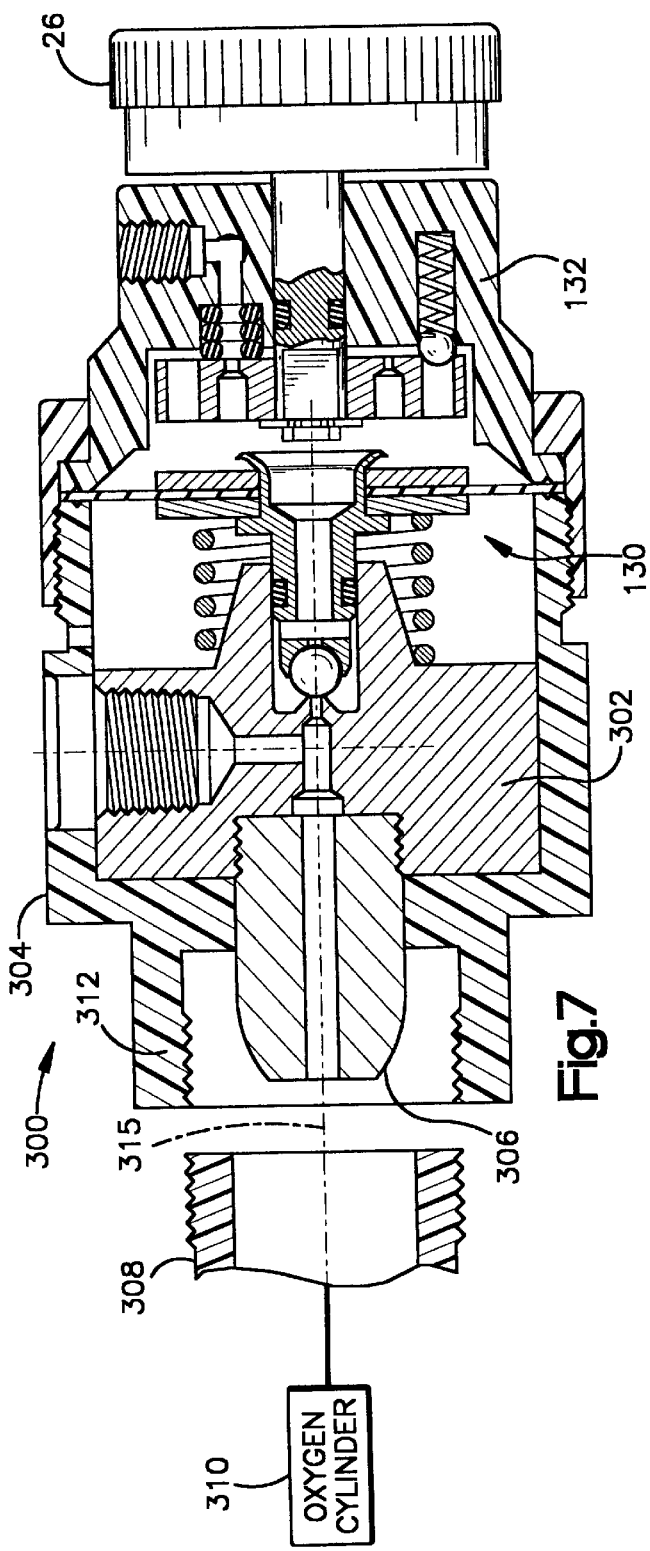
FIG. 7 is an exploded view of an apparatus comprising a third embodiment of the invention.

An alternative regulator 300 comprising a third embodiment of the present invention is shown in FIG. 7. The regulator 300 has many parts that are substantially the same as corresponding parts of the regulator 14 described above. This is indicated by the use of the same reference numbers for such corresponding parts in FIGS. 2 and 7. The regulator 300 thus includes a flow rate selector 26, a spring biased piston/cylinder assembly 130, and a plastic bonnet 132. However, the regulator 300 includes an alternative metal valve body 302 contained and supported by an alternative plastic part 304.

Figure 8:
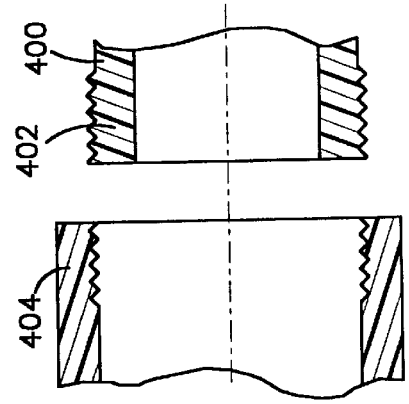
FIG. 8 is an enlarged partial view of parts of an apparatus comprising a fourth embodiment of the invention.

Unlike the metal body 70 described above, which defines an inlet stub 48 receivable in an outlet port 20 in a post valve 18, the metal body 302 has a separate inlet nipple 306 receivable in a screw-threaded cylinder valve outlet 308. The valve outlet 308 is a known part which is mounted on an oxygen cylinder 310 (shown schematically) in a known manner. The plastic part 304 of the regulator 300 likewise differs from the plastic part 100 of the regulator 14 by including an alternative mounting structure 312 in place of the yoke 34. The mounting structure 312 on the plastic part 304 is configured as an internally threaded sleeve receivable over the valve outlet 308 upon rotation of the regulator 300 about its longitudinal central axis 315. In a variation of this feature of the invention, a fourth embodiment includes a plastic part 400 with an externally thread mounting sleeve 402 receivable in an internally threaded nut portion 404 of a cylinder valve outlet, as shown partially in FIG. 8.

A regulator 500 comprising a fifth embodiment of the present invention is shown in FIG. 9. This regulator 500 has a metal valve body 502 defining an inlet port 504, a plastic part 506 defining an outlet port 508, and a spring biased piston 510 operatively interposed between the inlet and outlet ports 504 and 508. The metal body 502 has a high pressure passage 512 communicating the inlet port 504 with a control orifice 514. These parts of the regulator 500 function in a known matter substantially similar to that described above with reference to corresponding parts of the regulator 14. The regulator 500 further includes a spring-biased outlet pressure indicator 516 which also functions in a known matter.

In accordance with the present invention, the regulator 500 includes a one-piece plastic part 520 in which the metal body 502 is received and supported for mounting on a pressure vessel outlet valve. Specifically, the plastic part 520 and the metal body 502 have mating inner and outer cylindrical surfaces 522 and 524, respectively, which are tapered or otherwise configured to interlock the metal body 502 with the plastic part 520. A sleeve portion 526 of the plastic part 520 has an external screw thread 528 for engagement with an internal screw thread on a part like the part 404 shown in FIG. 8.

The invention has been described with reference to preferred embodiments. Those skilled in the art will perceive improvements, changes and modifications. Such improvements, changes and modifications are intended to be covered by the appended claims.

We claim:

1. Apparatus comprising:
   a plastic part defining a cylindrical compartment with a longitudinal central axis, said plastic part further defining a yoke configured to receive a pressure vessel post valve perpendicular to said axis, said yoke comprising a U-shaped structure having a pair of axially elongated side sections joined by a base section extending across said axis; and
   a cylindrical metal valve body received in said compartment, said valve body having an inlet port, a control orifice, and a high pressure gas passage extending from said inlet port to said control orifice;
   said plastic part having an annular end surface defining an open end of said compartment, a cylindrical inner surface mating with a cylindrical peripheral surface of said valve body within said compartment, and a pair of planar inner surfaces which face axially outward of said open end of said compartment in abutment with a planar surface of said valve body, with said planar inner surfaces being defined by said side sections of said yoke.

2. Apparatus as defined in claim 1 wherein said plastic part is a one-piece plastic part.

3. Apparatus comprising:
   a gas pressure control apparatus defining a high pressure inlet port, a low pressure outlet port, and a spring-biased piston operatively interposed between said inlet port and said outlet port;
   said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;
   said gas pressure control apparatus further including a plastic part configured to engage and support said metal part in an operative position in which said inlet port communicates with an outlet port on a pressure vessel outlet valve;

said metal part being received in a compartment in said plastic part and being interlocked with said plastic part, with said plastic part having a cylindrical inner surface mating with a cylindrical outer surface of said metal part within said compartment.

4. Apparatus as defined in claim 3 wherein said mating cylindrical surfaces are tapered so as to block movement of said metal part axially outward of said compartment.

5. Apparatus as defined in claim 3 wherein said mating cylindrical surfaces have undulating contours.

6. Apparatus as defined in claim 5 wherein said undulating contours are defined by helically extending splines.

7. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a plastic part configured to engage and support said metal part in an operative position in which said inlet port communicates with an outlet port on a pressure vessel outlet valve;

said metal part further having a branch passage extending from said high pressure passage to an outer surface of said metal part, with said branch passage being configured to receive a stem portion of a gas pressure gauge;

said plastic part having a wall portion extending over said outer surface of said metal part, with said wall portion of said plastic part having an access opening aligned with said branch passage to provide access for installation of the stem portion of the gas pressure gauge in said branch passage.

8. Apparatus as defined in claim 7 wherein said outer surface of said metal part is a cylindrical outer surface, and said wall portion of said plastic part is configured as a thin-wall cylinder with a cylindrical inner surface mating with said cylindrical outer surface of said metal part.

9. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a plastic part configured to engage and support said metal part in an operative position in which said inlet port communicates with an outlet port on a pressure vessel outlet valve;

wherein said piston is biased away from said metal part by a spring engaged compressively between said metal part and said piston; and said piston assembly is responsive to a gas pressure differential between first and second variable volume gas pressure chambers on opposite sides of said piston, with said plastic part defining a peripheral boundary of said second chamber.

10. Apparatus as defined in claim 9 wherein said plastic part defines a vent communicating said second chamber with the ambient atmosphere.

11. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a plastic part configured to engage and support said metal part in an operative position in which said inlet port communicates with an outlet port on a pressure vessel outlet valve, and a bonnet having a low pressure passage communicating said piston assembly with said outlet port;

said bonnet and said plastic part having opposed annular edge surfaces, with said piston being part of a piston assembly including a diaphragm having a peripheral portion clamped between said opposed annular edge surfaces.

12. Apparatus as defined in claim 11 wherein said bonnet is formed of plastic and has an internal screw thread configured to receive an external screw thread on a barb outlet.

13. Apparatus comprising:

a gas pressure control apparatus defining a valve structure and a mounting structure;

said mounting structure including a yoke configured to extend around a pressure vessel outlet valve;

said valve structure having a high pressure inlet port, a low pressure outlet port, a spring-biased piston operatively interposed between said inlet outlet ports, and a flow rate selector assembly operatively interposed between said piston and said outlet port;

said gas pressure control apparatus including an outlet part having a low pressure passage communicating said piston with said outlet port, a metal inlet part having a high pressure passage communicating said inlet port with said piston, and a plastic supporting part defining said yoke;

said metal inlet part further having a branch passage extending from said high pressure passage to an outer surface of said metal inlet part, with said branch passage being configured to receive a stem portion of a gas pressure gauge; and said plastic supporting part having a wall portion extending over said outer surface of said metal inlet part, with said wall portion of said plastic supporting part having an access opening aligned with said branch passage to provide access for installation of the stem in said branch passage.

14. Apparatus comprising:

a gas pressure control apparatus defining a valve structure and a mounting structure;

said mounting structure including a yoke configured to extend around a pressure vessel outlet valve;

said valve structure having a high pressure inlet port, a low pressure outlet port, a spring-biased piston operatively interposed between said inlet outlet ports, and a flow rate selector assembly operatively interposed between said piston and said outlet port;

said gas pressure control apparatus including an outlet part having a low pressure passage communicating said piston with said outlet port, a metal inlet part having a high pressure passage communicating said inlet port with said piston, and a plastic supporting part defining said yoke;

said plastic supporting part having a compartment in which said metal part is received and interlocked with said plastic supporting part.

15. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a supporting part configured to engage and support said metal part in an operative position in which said inlet port communicates with an outlet port on a pressure vessel outlet valve;

said metal part further having a branch passage extending from said high pressure passage to an outer surface of said metal part, with said branch passage being configured to receive a stem portion of a gas pressure gauge; and said supporting part having a wall portion extending over said outer surface of said metal part, with said wall portion of said supporting part having an access opening aligned with said branch passage to provide access for installation of the stem portion of the gas pressure gauge in said branch passage.

16. Apparatus as defined in claim 1 wherein said outer surface of said metal part is a cylindrical outer surface, and said wall portion of said supporting part is configured as a thin-wall cylinder with a cylindrical inner surface mating with said cylindrical outer surface of said metal part.

17. Apparatus comprising:

said gas pressure control apparatus including parts which together define a valve structure and a mounting structure;

said mounting structure including a yoke configured to extend around a pressure vessel outlet valve;

said valve structure having a high pressure inlet port, a low pressure outlet port, a spring-biased piston operatively interposed between said inlet and outlet ports, and a flow rate selector assembly operatively interposed between said piston and said outlet port;

said parts including an outlet part having a low pressure passage communicating said piston with said outlet port, a metal inlet part having a high pressure passage communicating said inlet port with said piston, and a supporting part defining said yoke;

said metal inlet part further having a branch passage extending from said high pressure passage to an outer surface of said metal inlet part, with said branch passage being configured to receive a stem portion of a gas pressure gauge; and said supporting part having a wall portion extending over said outer surface of said metal inlet part, with said wall portion of said supporting part having an access opening aligned with said branch passage to provide access for installation of the stem portion of the gas pressure gauge in said branch passage.

18. Apparatus as defined in claim 16 wherein said outer surface of said metal part is a cylindrical outer surface, and said wall portion of said supporting part is configured as a thin wall cylinder with a cylindrical inner surface mating with said cylindrical outer surface of said metal part.

19. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a supporting part configured to engage and support said metal part in an operative position in which said inlet port communicates with an outlet port on a pressure vessel outlet valve;

said gas pressure control apparatus further defining a gas flow path configured to direct gas to flow from said high pressure passage into a gas pressure gauge without contacting a surface of said supporting part;

said metal part being received in a compartment in said supporting part and being interlocked with said supporting part.

20. Apparatus as defined in claim 19 wherein said supporting part has a cylindrical inner surface mating with a cylindrical outer surface of said metal part within said compartment.

21. Apparatus as defined in claim 20 wherein said mating cylindrical surfaces are tapered so as to block movement of said metal part axially outward of said compartment.

22. Apparatus as defined in claim 19 wherein said mating cylindrical surfaces have undulating contours.

23. Apparatus as defined in claim 22 wherein said undulating contours are defined by helically extending splines.

24. Apparatus comprising:

a gas pressure control apparatus defining a high pressure inlet port, a low pressure outlet port, and a spring-biased piston operatively interposed between said inlet port and said outlet port;

said gas pressure control apparatus including a metal part having a high pressure passage communicating said inlet port with said piston, said high pressure passage having a portion with a relatively constricted flow area, whereby compression of gas flowing through said high pressure passage yields heat of compression that heats said metal part;

said gas pressure control apparatus further including a supporting part configured to engage and support said metal part in an operative position in which said inlet port communicates with an outlet port on a pressure vessel outlet valve;

said gas pressure control apparatus further defining a gas flow path configured to direct gas to flow from said high pressure passage into a gas pressure gauge without contacting a surface of said supporting part;

said metal part having a branch passage extending from said high pressure passage to an outer surface of said metal part, with said branch passage being configured to receive a stem portion of the gas pressure gauge;

said supporting part having a wall portion extending over said outer surface of said metal part, with said wall portion of said supporting part having an access opening aligned with said branch passage to provide access for installation of the stem portion of the gas pressure gauge in said branch passage.

25. Apparatus as defined in claim 19 wherein said outer surface of said metal part is a cylindrical outer surface, and said wall portion of said supporting part is configured as a thin wall cylinder with a cylindrical inner surface mating with said cylindrical outer surface of said metal part.

\* \* \* \* \*